US012521092B2

(12) United States Patent
Takemoto

(10) Patent No.: US 12,521,092 B2
(45) Date of Patent: Jan. 13, 2026

(54) ULTRASOUND DIAGNOSTIC APPARATUS AND CONTROL METHOD OF ULTRASOUND DIAGNOSTIC APPARATUS

(71) Applicant: FUJIFILM Corporation, Tokyo (JP)

(72) Inventor: Kosei Takemoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 142 days.

(21) Appl. No.: 18/171,026

(22) Filed: Feb. 17, 2023

(65) Prior Publication Data

US 2023/0200782 A1    Jun. 29, 2023

Related U.S. Application Data

(63) Continuation of application No. PCT/JP2021/009701, filed on Mar. 11, 2021.

(30) Foreign Application Priority Data

Sep. 2, 2020   (JP) .................................. 2020-147565

(51) Int. Cl.
*A61B 8/00*   (2006.01)
*A61B 5/00*   (2006.01)
*A61B 8/08*   (2006.01)

(52) U.S. Cl.
CPC ............ *A61B 8/463* (2013.01); *A61B 5/0035* (2013.01); *A61B 5/0077* (2013.01); *A61B 5/445* (2013.01);
(Continued)

(58) Field of Classification Search
CPC ..... A61B 8/463; A61B 5/0035; A61B 5/0077; A61B 5/445; A61B 5/7425; A61B 8/0858;
(Continued)

(56) References Cited

U.S. PATENT DOCUMENTS

2011/0184291 A1*  7/2011  Okamura ............... A61B 34/10
                                                        600/443
2014/0187936 A1*  7/2014  Nakamura ........... A61B 5/7425
                                                        600/407
(Continued)

FOREIGN PATENT DOCUMENTS

JP         2015136563 A  *  7/2015
JP         2020-503942 A     2/2020
(Continued)

OTHER PUBLICATIONS

International Search Report issued in PCT/JP2021/009701; mailed May 18, 2021.
(Continued)

*Primary Examiner* — Pascal M Bui Pho
*Assistant Examiner* — Nicholas A Robinson
(74) *Attorney, Agent, or Firm* — Studebaker Brackett PLLC

(57) ABSTRACT

An ultrasound diagnostic apparatus (1) includes an ultrasound probe (2) having a predetermined size; and a portable diagnostic apparatus main body (3), in which the diagnostic apparatus main body (3) includes a camera (25) that captures an optical image including a wound region of a subject and the ultrasound probe, an image generation unit (22) that generates an ultrasound image for the wound region, a monitor (24) that displays the optical image and the ultrasound image, an extraction unit (26) that extracts the wound region and the ultrasound probe from the optical image, and a wound size calculation unit (27) that calculates an actual size of the wound region on the basis of the predetermined size of the ultrasound probe (2) by comparing the extracted wound region and the extracted ultrasound probe (2), and displays the actual size on the monitor (24).

4 Claims, 11 Drawing Sheets

(52) U.S. Cl.
CPC .......... *A61B 5/7425* (2013.01); *A61B 8/0858* (2013.01); *A61B 8/4427* (2013.01)

(58) Field of Classification Search
CPC . A61B 8/4427; A61B 2505/01; A61B 5/1072; A61B 5/1073; A61B 5/1075; A61B 5/1079; A61B 5/743; A61B 8/4416; A61B 8/468; A61B 8/5207; A61B 8/5223
See application file for complete search history.

(56) References Cited

U.S. PATENT DOCUMENTS

| | | | |
|---|---|---|---|
| 2016/0284084 A1* | 9/2016 | Gurcan | .................. G16H 30/40 |
| 2017/0071571 A1* | 3/2017 | Lee | ......................... A61B 8/085 |
| 2018/0192982 A1 | 7/2018 | Pereira et al. | |
| 2018/0308247 A1* | 10/2018 | Gupta | ....................... G06T 7/62 |
| 2020/0268344 A1* | 8/2020 | Pelissier | ................ G16H 80/00 |
| 2021/0298720 A1 | 9/2021 | Karasawa et al. | |

FOREIGN PATENT DOCUMENTS

| | | |
|---|---|---|
| JP | 2020-064464 A | 4/2020 |
| WO | 2020/149092 A1 | 7/2020 |

OTHER PUBLICATIONS

International Preliminary Report On Patentability (Chapter I) and Written Opinion of the International Searching Authority issued in PCT/JP2021/009701; issued Mar. 7, 2023.

Mori, Taketoshi; "Fusion of wound healing and other fields"; Program and Abstracts of the 48th Annual Meeting of Japanese Society for Wound Healing; Nov. 14, 2018; Total 3 Pages.

* cited by examiner

ULTRASOUND DIAGNOSTIC APPARATUS AND CONTROL METHOD OF ULTRASOUND DIAGNOSTIC APPARATUS

CROSS-REFERENCE TO RELATED APPLICATIONS

This application is a Continuation of PCT International Application No. PCT/JP2021/009701 filed on Mar. 11, 2021, which claims priority under 35 U.S.C. § 119(a) to Japanese Patent Application No. 2020-147565 filed on Sep. 2, 2020. The above applications are hereby expressly incorporated by reference, in its entirety, into the present application.

BACKGROUND OF THE INVENTION

1. Field of the Invention

The present invention relates to an ultrasound diagnostic apparatus, and a control method of the ultrasound diagnostic apparatus which are for examining a wound region of a subject.

2. Description of the Related Art

In the related art, a technique of calculating a size of an imaging target in an optical image by analyzing the optical image has been developed. For example, JP2020-64464A discloses a measurement system that includes a measurement module including a camera that acquires an optical image of an imaging target, and an image processing apparatus that calculates a size of the imaging target by analyzing the acquired optical image.

SUMMARY OF THE INVENTION

A so-called ultrasound diagnostic apparatus is sometimes used to perform an examination for an abnormal portion such as pressure ulcers, and edema that is a kind of phlebitis occurring in the subject. In a case where an examination is performed on the abnormal portion, a wound region appearing on the body surface of the subject is often observed prior to observing an abnormal portion inside the subject by capturing an ultrasound image. In a case where the wound region positioned on the body surface of the subject is observed, the size of the wound region is measured. However, even in a case of using the technique disclosed in JP2020-64464A, it is necessary to operate a camera prepared separately from the ultrasound diagnostic apparatus to capture an optical image of the wound region. Thus, in a case of performing an examination on the wound region, it is difficult to smoothly perform the examination because it is necessary to handle a plurality of apparatuses.

The present invention has been made in order to solve such a problem in the related art, and an object of the present invention is to provide an ultrasound diagnostic apparatus and a control method of the ultrasound diagnostic apparatus which allow a user to smoothly perform an examination on a wound region.

In order to achieve the object, an ultrasound diagnostic apparatus according to an aspect of the present invention includes an ultrasound probe having a predetermined size; and a portable diagnostic apparatus main body, in which the diagnostic apparatus main body includes a camera that captures an optical image including a wound region of a subject and the ultrasound probe, an image generation unit that generates an ultrasound image for the wound region by performing transmission and reception of an ultrasound beam using the ultrasound probe, a monitor that displays the optical image and the ultrasound image, an extraction unit that extracts the wound region and the ultrasound probe from the optical image, and a wound size calculation unit that calculates an actual size of the wound region on the basis of the predetermined size of the ultrasound probe by comparing the extracted wound region with the extracted ultrasound probe, and displays the actual size on the monitor.

The diagnostic apparatus main body can include an input device that designates any two points in the wound region of the optical image displayed on the monitor, by a user's input, and the wound size calculation unit can calculate an actual distance between the two points designated via the input device, and display the actual distance on the monitor.

In this case, the wound size calculation unit can calculate an actual length of a longest straight line that is orthogonal to a straight line connecting the two points and is present in the wound region, and display the actual length on the monitor.

The diagnostic apparatus main body can include a deep portion shape detection unit that detects a shape of a deep portion inside the subject corresponding to the wound region by analyzing the ultrasound image, and the shape of the deep portion detected by the deep portion shape detection unit can be displayed on the monitor by being superimposed on the optical image.

In this case, the wound size calculation unit can calculate a size of the shape of the deep portion inside the subject corresponding to the wound region by comparing the shape of the deep portion inside the subject corresponding to the wound region detected by the deep portion shape detection unit with the ultrasound probe extracted by the extraction unit, and display the size on the monitor.

A control method of an ultrasound diagnostic apparatus according to another aspect of the present invention includes capturing an optical image including a wound region of a subject and an ultrasound probe having a predetermined size; generating an ultrasound image for the wound region by performing transmission and reception of an ultrasound beam using the ultrasound probe; displaying the optical image and the ultrasound image; extracting the wound region and the ultrasound probe from the optical image; and calculating an actual size of the wound region on the basis of the predetermined size of the ultrasound probe by comparing the extracted wound region with the extracted ultrasound probe, and displaying the actual size on a monitor.

According to the present invention, an ultrasound diagnostic apparatus includes an ultrasound probe having a predetermined size; and a portable diagnostic apparatus main body, in which the diagnostic apparatus main body includes a camera that captures an optical image including a wound region of a subject and the ultrasound probe, an image generation unit that generates an ultrasound image for the wound region by performing transmission and reception of an ultrasound beam using the ultrasound probe, a monitor that displays the optical image and the ultrasound image, an extraction unit that extracts the wound region and the ultrasound probe from the optical image, and a wound size calculation unit that calculates an actual size of the wound region on the basis of the predetermined size of the ultrasound probe by comparing the extracted wound region with the extracted ultrasound probe, and displays the actual size on the monitor. Therefore, it is possible for the user to smoothly perform an examination for the wound region.

DESCRIPTION OF THE PREFERRED EMBODIMENTS

Hereinafter, embodiments of the invention will be described with reference to the accompanying drawings.

The description of configuration requirements described below is given on the basis of the representative embodiment of the present invention, but the present invention is not limited to such an embodiment.

In the present specification, a numerical range represented using "to" means a range including the numerical values before and after "to" as a lower limit value and an upper limit value.

In the present specification, the terms "same" and "identical" include an error range generally allowed in the technical field.

First Embodiment

Figure 1:
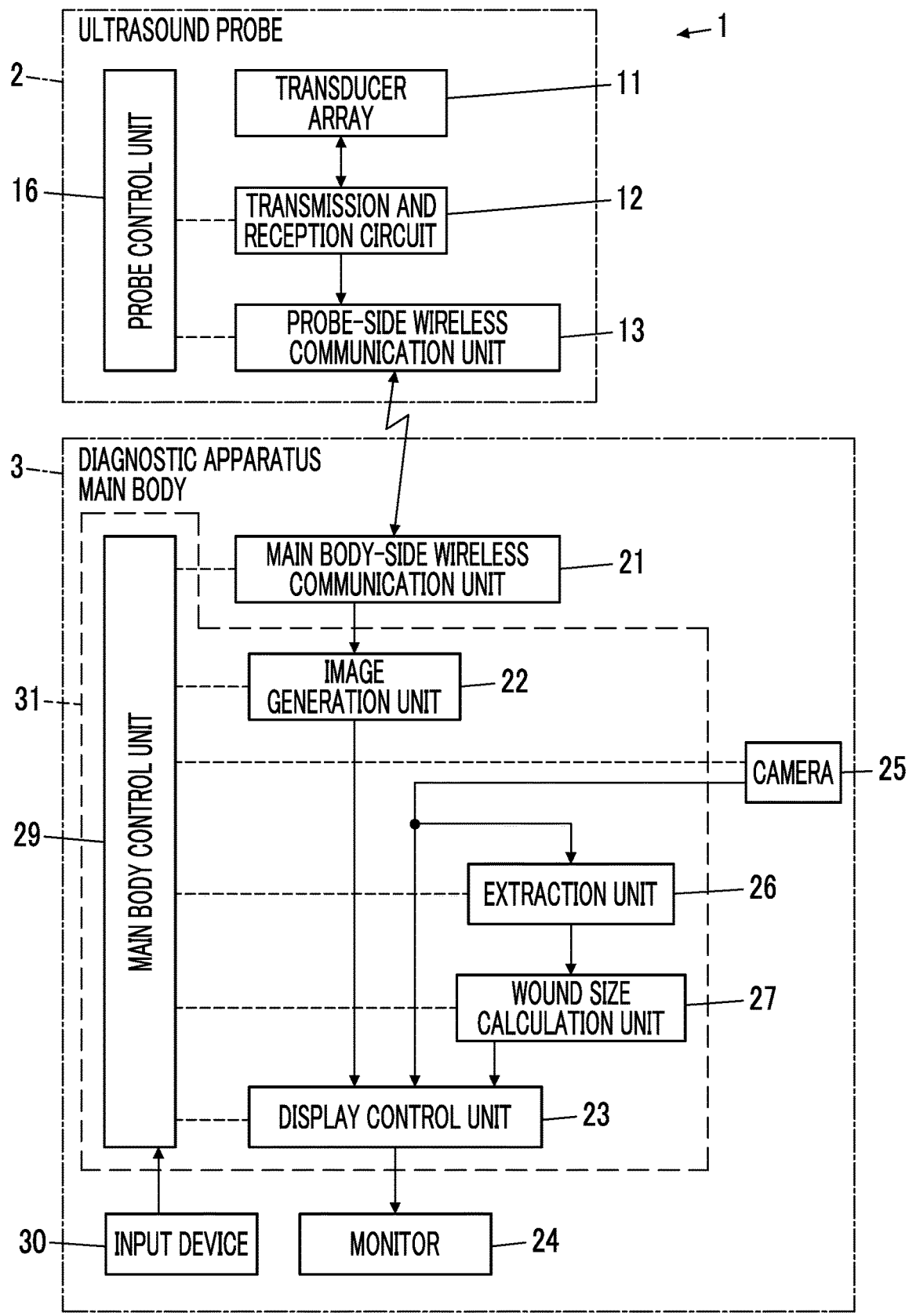
FIG. 1 is a block diagram illustrating a configuration of an ultrasound diagnostic apparatus according to a first embodiment of the present invention.

FIG. 1 illustrates a configuration of an ultrasound diagnostic apparatus 1 according to a first embodiment of the present invention. The ultrasound diagnostic apparatus 1 includes an ultrasound probe 2 having a predetermined size and a diagnostic apparatus main body 3. The ultrasound probe 2 and the diagnostic apparatus main body 3 are connected to each other by wireless communication.

The ultrasound probe 2 has a transducer array 11, and a transmission and reception circuit 12 and a probe-side wireless communication unit 13 are sequentially connected to the transducer array 11. The transmission and reception circuit 12 and the probe-side wireless communication unit 13 are connected to a probe control unit 16.

The diagnostic apparatus main body 3 includes a main body-side wireless communication unit 21, and an image generation unit 22, a display control unit 23, and a monitor 24 are sequentially connected to the main body-side wireless communication unit 21. The diagnostic apparatus main body 3 includes a camera 25, and the display control unit 23 and an extraction unit 26 are connected to the camera 25. A wound size calculation unit 27 is connected to the extraction unit 26, and the display control unit 23 is connected to the wound size calculation unit 27.

A main body control unit 29 is connected to the main body-side wireless communication unit 21, the image generation unit 22, the display control unit 23, the camera 25, the extraction unit 26, and the wound size calculation unit 27. An input device 30 is connected to the main body control unit 29.

Further, the image generation unit 22, the display control unit 23, the extraction unit 26, the wound size calculation unit 27, and the main body control unit 29 constitute a main body-side processor 31.

The transducer array 11 of the ultrasound probe 2 illustrated in FIG. 1 has a plurality of transducers arranged in a one-dimensional or two-dimensional manner. According to a drive signal supplied from the transmission and reception circuit 12, each of the transducers transmits an ultrasonic wave and receives an ultrasound echo from a subject to output a signal based on the ultrasound echo. For example, each transducer is configured by forming electrodes at both ends of a piezoelectric body consisting of piezoelectric ceramic represented by lead zirconate titanate (PZT), a polymer piezoelectric element represented by poly vinylidene di fluoride (PVDF), piezoelectric single crystal represented by lead magnesium niobate-lead titanate (PMN-PT), or the like.

Figure 2:
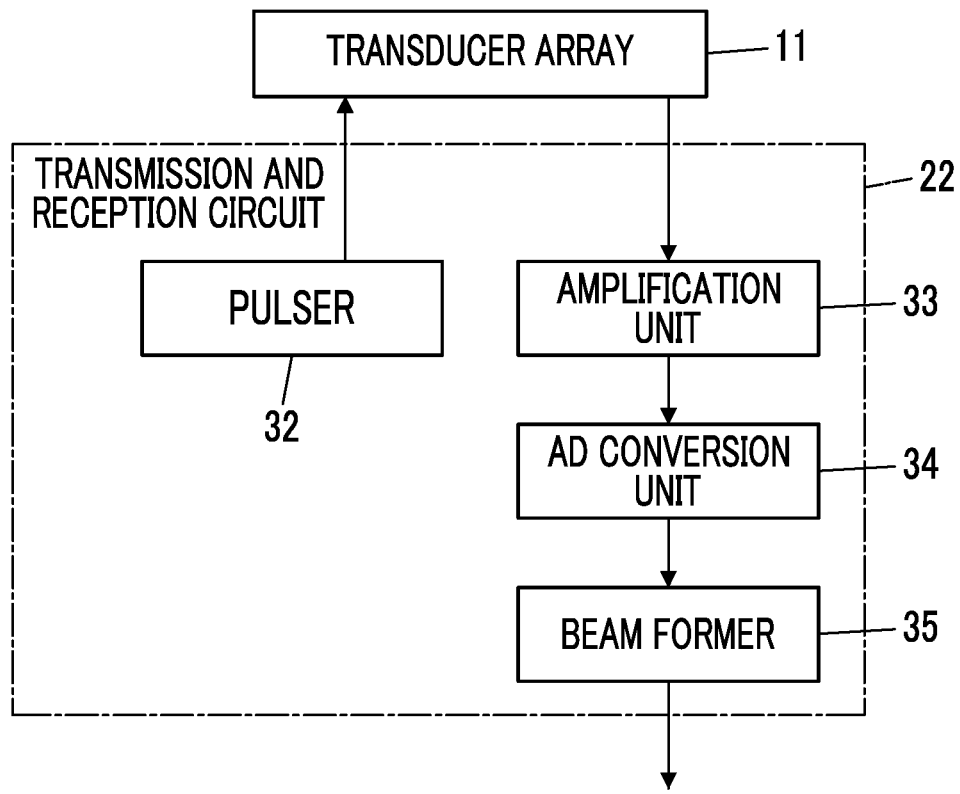
FIG. 2 is a block diagram illustrating a configuration of a transmission and reception circuit in the first embodiment of the present invention.

The transmission and reception circuit 12 causes the transducer array 11 to transmit the ultrasonic wave and generates a sound ray signal on the basis of a reception signal acquired by the transducer array 11, under the control of the probe control unit 16. As illustrated in FIG. 2, the transmission and reception circuit 12 has a pulser 32 connected to the transducer array 11, and an amplification unit 33, an analog digital (AD) conversion unit 34, and a beam former 35 that are sequentially connected in series from the transducer array 11.

The pulser 32 includes, for example, a plurality of pulse generators, and the pulser 32 adjusts the amount of delay of each drive signal so that ultrasonic waves transmitted from the plurality of transducers of the transducer array 11 form an ultrasound beam on the basis of a transmission delay pattern selected according to the control signal from the probe control unit 16, and supplies the obtained signals to the plurality of transducers. Thus, in a case where a pulsed or continuous-wave voltage is applied to the electrodes of the transducers of the transducer array 11, the piezoelectric body expands and contracts to generate pulsed or continuous-wave ultrasonic waves from each transducer. From the combined wave of these ultrasonic waves, an ultrasound beam is formed.

The transmitted ultrasound beam is reflected by a target, for example, a site of the subject, and propagates toward the transducer array 11 of the ultrasound probe 2. The ultrasound echo propagating toward the transducer array 11 in this manner is received by each transducer constituting the transducer array 11. In this case, each transducer constituting the transducer array 11 expands and contracts by receiving the propagating ultrasound echo to generate a reception signal that is an electric signal, and outputs the reception signal to the amplification unit 33.

The amplification unit 33 amplifies the signals input from each transducer constituting the transducer array 11, and transmits the amplified signals to the AD conversion unit 34. The AD conversion unit 34 converts the signal transmitted from the amplification unit 33 into digital reception data, and transmits the reception data to the beam former 35. The beam former 35 performs so-called reception focusing processing in which addition is performed by giving delays to respective pieces of the reception data converted by the AD conversion unit 34 according to a sound speed distribution or a sound speed set on the basis of a reception delay pattern selected according to the control signal from the probe control unit 16. Through the reception focusing processing, a sound ray signal in which each piece of the reception data converted by the AD conversion unit 34 is phased and added and the focus of the ultrasound echo is narrowed is acquired.

The probe-side wireless communication unit 13 is configured by a circuit or the like including an antenna for transmitting and receiving radio waves, and performs wireless communication with the main body-side wireless communication unit 21 of the diagnostic apparatus main body 3 under the control of the probe control unit 16. The probe-side wireless communication unit 13 modulates a carrier on the basis of the sound ray signal generated by the transmission and reception circuit 12, generates a transmission signal representing the sound ray signal, and wirelessly transmits the generated transmission signal to the main body-side wireless communication unit 21 of the diagnostic apparatus main body 3.

As the modulation method of the carrier, for example, amplitude shift keying (ASK), phase shift keying (PSK), quadrature phase shift keying (QPSK), 16 quadrature amplitude modulation (16QAM), or the like is used.

The probe control unit 16 controls each unit of the ultrasound probe 2 on the basis of a program and the like stored in advance.

Although not illustrated, a battery that supplies power to each unit of the ultrasound probe 2 is built in the ultrasound probe 2.

The diagnostic apparatus main body 3 is a portable device, and is configured by a thin computer called a so-called tablet terminal, for example.

Similarly to the probe-side wireless communication unit 13, the main body-side wireless communication unit 21 of the diagnostic apparatus main body 3 is configured by a circuit or the like including an antenna for transmitting and receiving radio waves, and performs wireless communication with the probe-side wireless communication unit 13 of the ultrasound probe 2 under the control of the main body control unit 29. In this case, the main body-side wireless communication unit 21 demodulates the transmission signal wirelessly transmitted from the probe-side wireless communication unit 13 to obtain a sound ray signal. The main body-side wireless communication unit 21 sends the obtained sound ray signal to the image generation unit 22.

The main body-side wireless communication unit 21 modulates the carrier on the basis of control information or the like, which is for controlling the ultrasound probe 2 and is input by the user via the input device 30, to generate a transmission signal representing the control information or the like, and wirelessly transmits the generated transmission signal to the probe-side wireless communication unit 13.

Similarly to the modulation method used in the probe-side wireless communication unit 13, as the modulation method of the carrier, ASK, PSK, QPSK, 16QAM, or the like is used.

Figure 3:
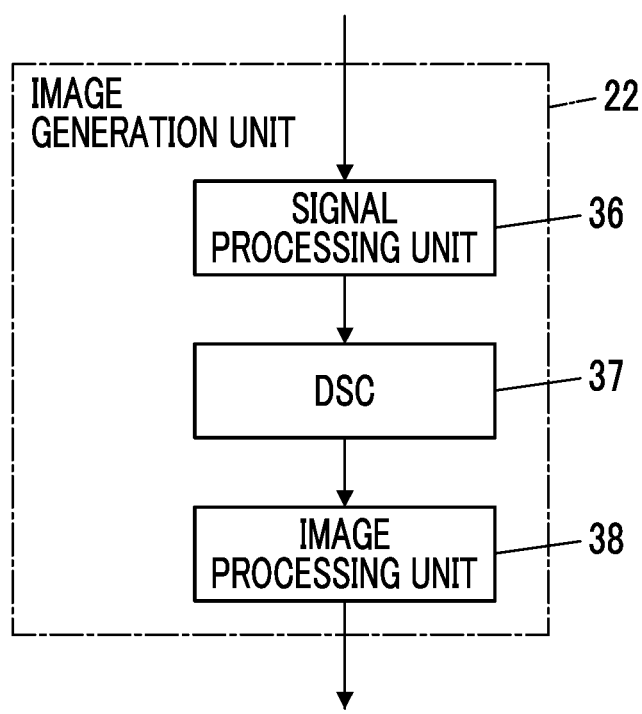
FIG. 3 is a block diagram illustrating a configuration of an image generation unit in the first embodiment of the present invention.

As illustrated in FIG. 3, the image generation unit 22 has a configuration in which a signal processing unit 36, a digital scan converter (DSC) 37, and an image processing unit 38 are sequentially connected in series.

The signal processing unit 36 generates a B-mode image signal which is tomographic image information regarding tissues inside the subject, by performing, on the sound ray signal sent from the main body-side wireless communication unit 21, correction of the attenuation due to the distance according to the depth of the reflection position of the ultrasonic wave and then performing envelope detection processing.

The DSC 37 converts (raster conversion) the B-mode image signal generated by the signal processing unit 36 into an image signal according to a normal television signal scanning method.

The image processing unit 38 performs various kinds of necessary image processing such as gradation processing on the B-mode image signal input from the DSC 37, and then sends the B-mode image signal to the display control unit 23. In the following, the B-mode image signal subjected to the image processing by the image processing unit 38 is simply referred to as an ultrasound image.

The display control unit 23 performs predetermined processing on the ultrasound image or the like generated by the image generation unit 22, and displays the ultrasound image or the like on the monitor 24, under the control of the main body control unit 29.

Figure 4:
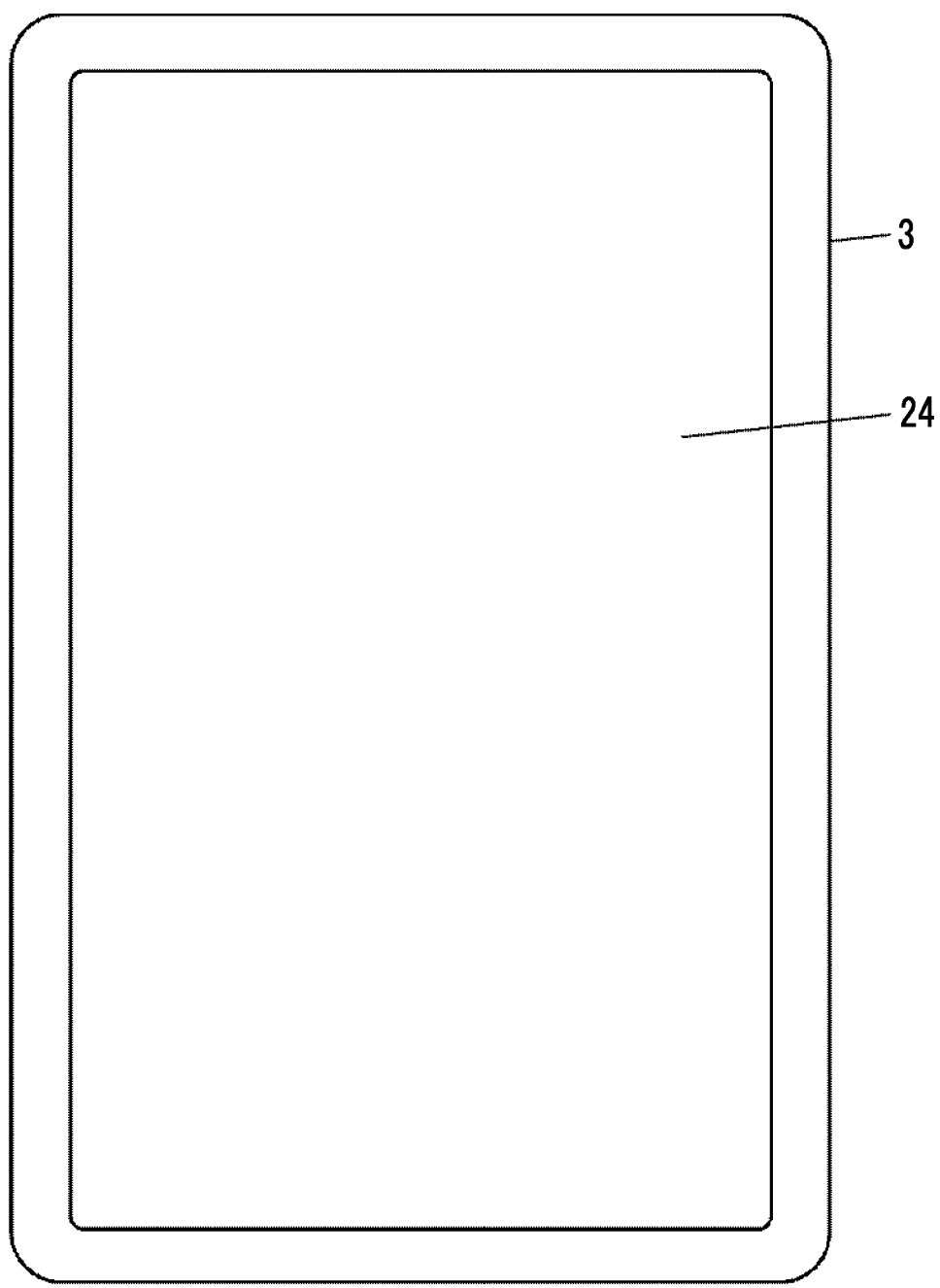
FIG. 4 is a schematic front view of a diagnostic apparatus main body in the first embodiment of the present invention.

For example, the monitor 24 is arranged on the front surface of the diagnostic apparatus main body 3 as illustrated in FIG. 4, and performs various kinds of display under the control of the display control unit 23. The monitor 24 includes a display device such as a liquid crystal display (LCD), or an organic electroluminescence (EL) display.

The input device 30 is for the user to perform an input operation, and includes a touch panel, a button (not illustrated), a switch (not illustrated), and the like that are arranged on the monitor 24 in a superimposed manner.

Figure 5:
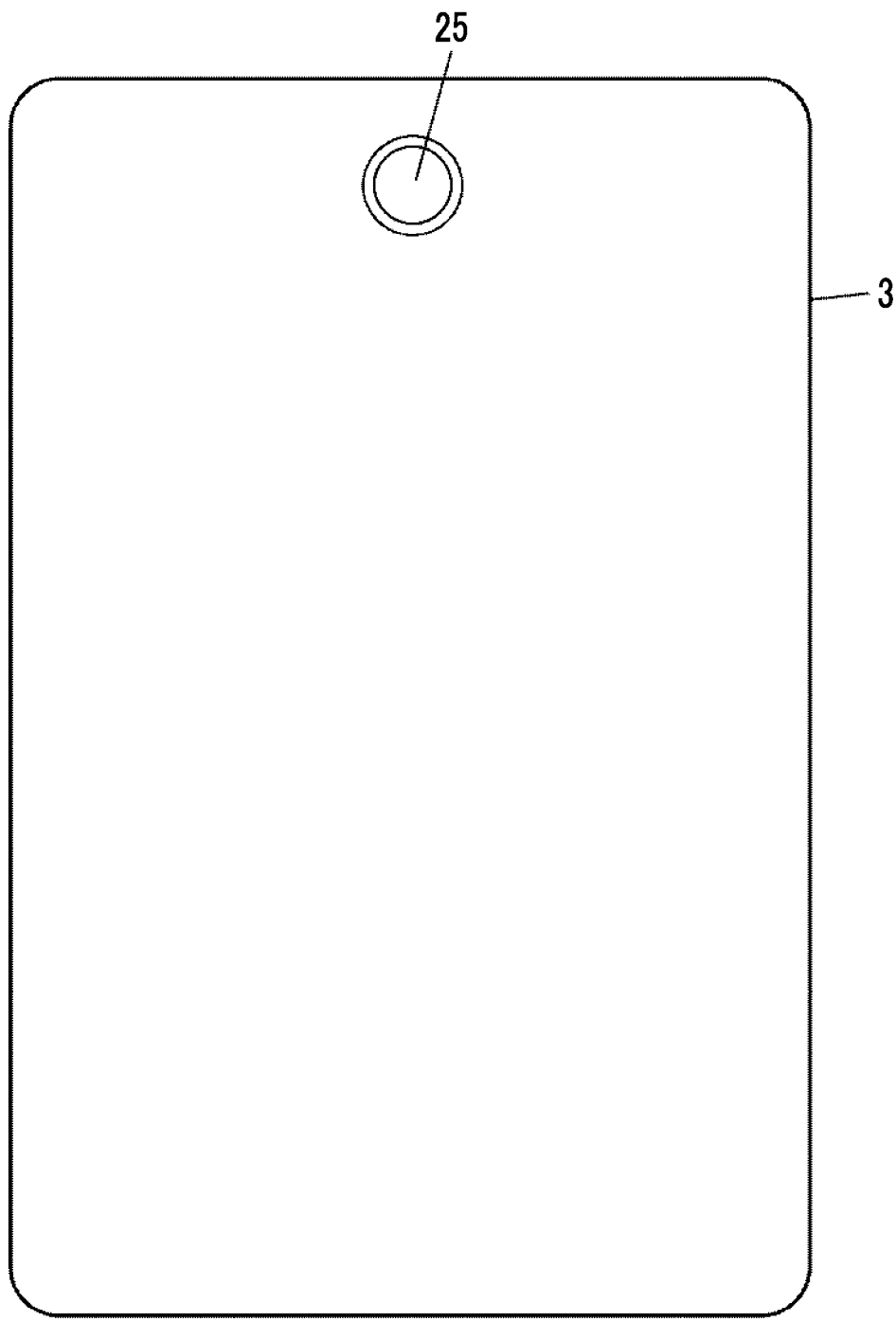
FIG. 5 is a schematic rear view of the diagnostic apparatus main body in the first embodiment of the present invention.

The camera 25 is for capturing an optical image, and is arranged on the rear surface of the diagnostic apparatus main body 3 as illustrated in FIG. 5, for example. Although not illustrated, an imaging lens, an image sensor that images a visual field through the imaging lens to acquire an optical image signal as the analog signal, an analog signal processing circuit that amplifies the optical image signal acquired by the image sensor and converts the optical image signal into the digital signal, and a digital signal processing circuit that performs various kinds of correction of gain or the like on the converted digital signal to generate an optical image are built in the camera 25. The analog signal processing circuit and the digital signal processing circuit can be built in the main body-side processor 31. The optical image captured by the camera 25 is sent to the display control unit 23 and the extraction unit 26.

The extraction unit 26 performs processing of extracting the wound region of the subject and the ultrasound probe 2 from the optical image by analyzing the optical image captured by the camera 25. As the method of extracting the wound region and the ultrasound probe 2 from the optical image, for example, the extraction unit 26 can use a deep learning method such as so-called U-net, a so-called template matching method, a machine learning method using a support vector machine (SVM), AdaBoost, and the like, a machine learning method described in Csurka et al.: Visual Categorization with Bags of Keypoints, Proc. of ECCV Workshop on Statistical Learning in Computer Vision, pp. 59-74 (2004), and the like.

Figure 6:
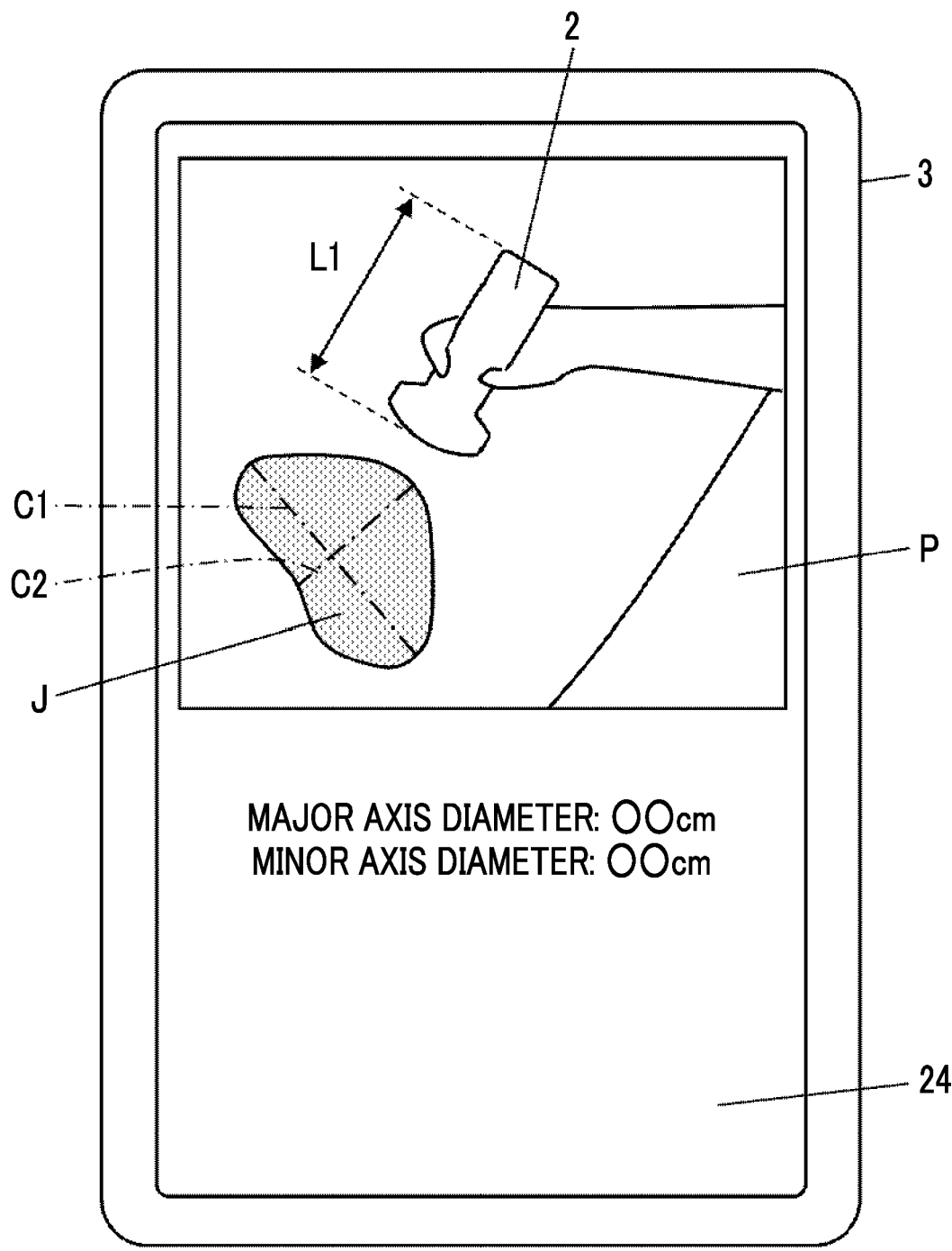
FIG. 6 is a diagram schematically illustrating an example of an optical image including an ultrasound probe and a wound region, which is displayed on a monitor.

The wound size calculation unit 27 stores an actual size of the ultrasound probe 2, and calculates an actual size of a wound region J on the basis of the actual size of the ultrasound probe 2 by comparing the wound region J on an optical image P extracted by the extraction unit 26 with the ultrasound probe 2 on the optical image P extracted by the extraction unit 26 as illustrated in FIG. 6.

In a case where the size of the wound region J on the optical image P is calculated, for example, the wound size calculation unit 27 sets a line segment with the maximum length among line segments connecting two points on a contour line of the wound region J as a first measurement line C1, calculates the length of the first measurement line C1 as a major axis diameter of the wound region J, sets a line segment with the maximum length among line segments connecting two points on the contour line of the wound region J in a direction orthogonal to the first measurement line C1 as a second measurement line C2, and calculates the length of the second measurement line C2 as a minor axis diameter of the wound region J.

For example, in a case where the actual size of the wound region J is calculated, the wound size calculation unit 27 calculates an actual length per pixel in the optical image P on the basis of a length L1 of the ultrasound probe 2 on the optical image P and the actual size of the ultrasound probe 2 stored in advance. The wound size calculation unit 27 can further calculate the actual size of the wound region J from the actual length per pixel in the optical image P and the size of the wound region J on the optical image P.

The wound size calculation unit 27 displays the actual size of the wound region J calculated in this manner on the monitor 24. In the example of FIG. 6, the wound size calculation unit 27 displays the major axis diameter of the wound region J, the first measurement line C1 corresponding to the major axis diameter, the minor axis diameter of the wound region J, and the second measurement line C2 corresponding to the minor axis diameter on the monitor 24.

The main body control unit 29 controls each unit of the diagnostic apparatus main body 3 on the basis of a control program and the like stored in advance.

The main body-side processor 31 including the image generation unit 22, the display control unit 23, the extraction unit 26, the wound size calculation unit 27, and the main body control unit 29 are configured by a central processing unit (CPU) and a control program for causing the CPU to execute various kinds of processing, but the main body-side processor 31 may be configured by using a field programmable gate array (FPGA), a digital signal processor (DSP), an application specific integrated circuit (ASIC), a graphics processing unit (GPU), or other integrated circuits (IC) or may be configured by a combination thereof.

Further, the image generation unit 22, the extraction unit 26, the wound size calculation unit 27, and the main body control unit 29 of the main body-side processor 31 can also be configured by being integrated partially or entirely into one CPU or the like.

Figure 7:
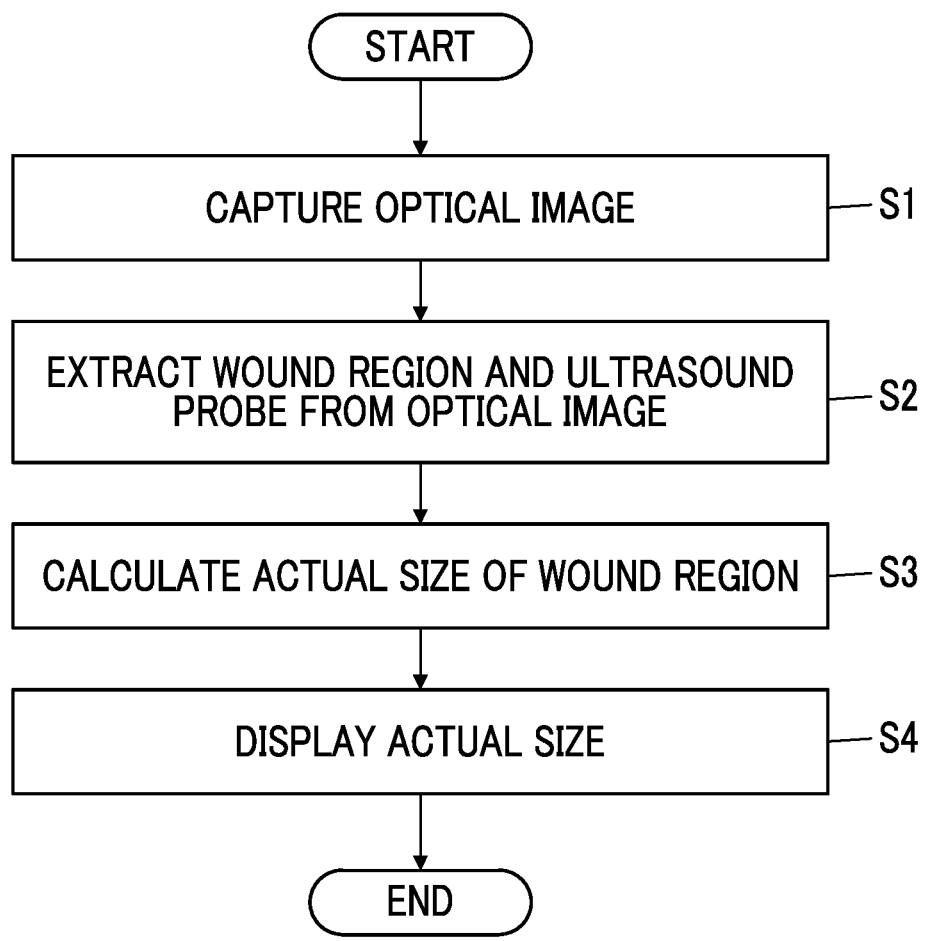
FIG. 7 is a flowchart illustrating an operation of the ultrasound diagnostic apparatus according to the first embodiment of the present invention.

In the following, the basic operation of the ultrasound diagnostic apparatus 1 of the first embodiment will be described in detail using the flowchart illustrated in FIG. 7.

First, in Step S1, a command to capture the optical image P is input by the user via the input device 30, and the optical image P including the wound region J of the subject and the ultrasound probe 2 as illustrated in FIG. 6 is captured by the camera 25. Here, in the subsequent processing, it is preferable to capture the optical image P of the ultrasound probe 2 in a state where the length L1 of the ultrasound probe 2 on the optical image P is maximized in order to improve the accuracy of calculating the actual length per pixel in the optical image P.

Next, in Step S2, the extraction unit 26 extracts the wound region J and the ultrasound probe 2 from the optical image P by analyzing the optical image P captured in Step S1.

In subsequent Step S3, the wound size calculation unit 27 calculates the actual size of the wound region J on the basis of the actual size of the ultrasound probe 2 stored in advance by comparing the wound region J with the ultrasound probe 2 on the optical image P which are extracted in Step S2.

Figure 8:
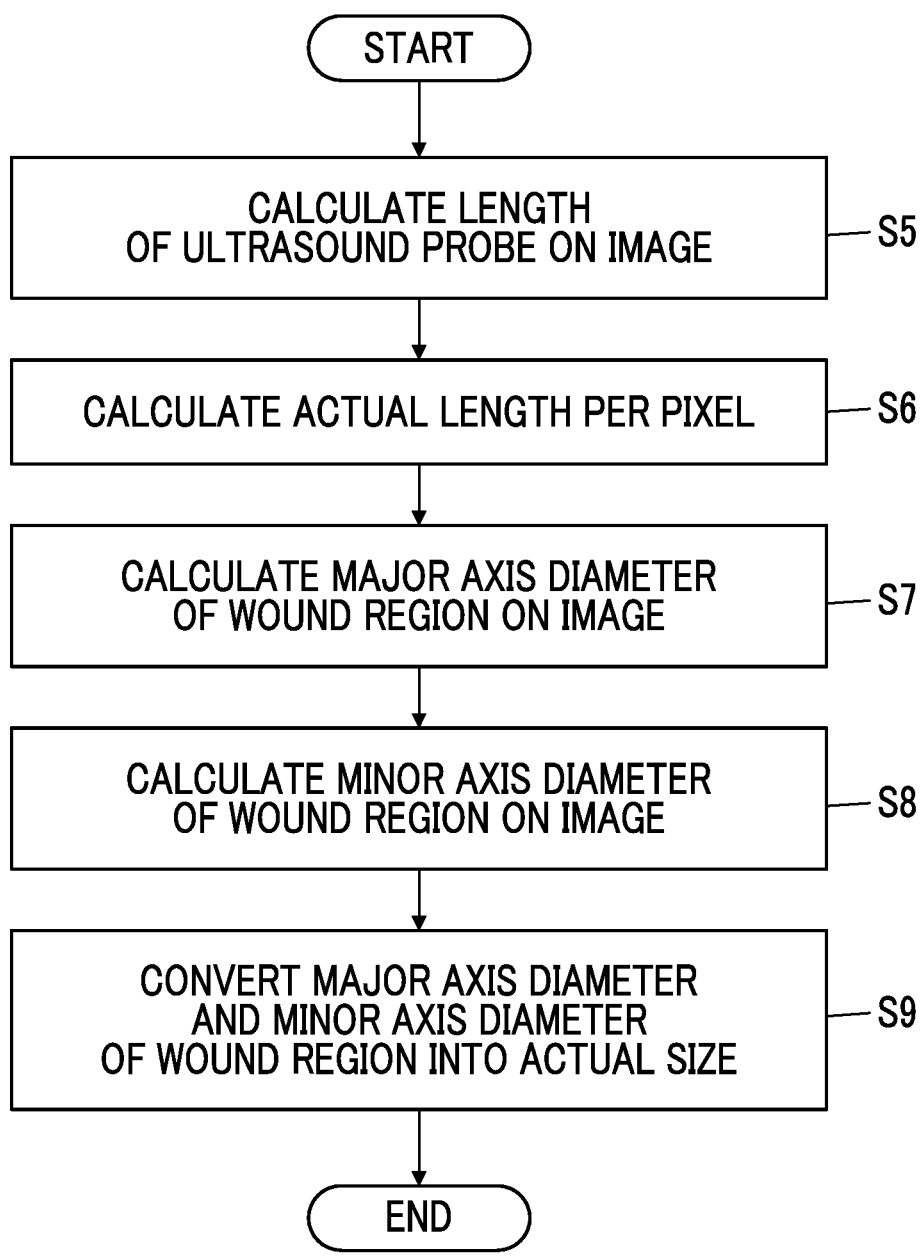
FIG. 8 is a flowchart illustrating in detail processing of calculating an actual size of the wound region in the first embodiment of the present invention.

Here, the processing of Step S3 will be described in detail using the flowchart illustrated in FIG. 8.

First, in Step S5, the wound size calculation unit 27 calculates the length L1 of the ultrasound probe 2 on the optical image P extracted in Step S2 as illustrated in FIG. 6. In this case, the wound size calculation unit 27 calculates the length L1 of the ultrasound probe 2 on the optical image P in units of pixels, for example.

Next, in Step S6, the wound size calculation unit 27 calculates the actual length per pixel in the optical image P by comparing the actual size of the ultrasound probe 2 stored in advance with the length L1 of the ultrasound probe 2 on the optical image P calculated in Step S5. In this manner, the length on the optical image P can be converted into the actual length.

In Step S7, the wound size calculation unit 27 sets a line segment with the maximum length among line segments connecting two points on the contour line of the wound region J as the first measurement line C1, and calculates the length of the first measurement line C1 as the major axis diameter of the wound region J on the optical image P, as illustrated in FIG. 6.

In subsequent Step S8, as illustrated in FIG. 6, the wound size calculation unit 27 sets a line segment with the maximum length among line segments connecting two points on the contour line of the wound region J in a direction orthogonal to the first measurement line C1 as the second measurement line C2, and calculates the length of the second measurement line C2 as the minor axis diameter of the wound region J on the optical image P.

Finally, in Step S9, the wound size calculation unit 27 converts the major axis diameter of the wound region J on the optical image P calculated in Step S7 into the actual major axis diameter of the wound region J on the basis of the actual length per pixel in the optical image P calculated in Step S6. Similarly, the wound size calculation unit 27 converts the minor axis diameter of the wound region J on the optical image P calculated in Step S8 into the actual minor axis diameter of the wound region J on the basis of the actual length per pixel in the optical image P.

In this manner, the processing of Step S3 in which the actual size of the wound region J is calculated is completed by the processing of Step S5 to Step S9. In a case where the processing of Step S3 is completed, the processing proceeds to Step S4.

In Step S4, the wound size calculation unit 27 displays the actual size of the wound region J calculated in Step S3 on the monitor 24 as illustrated in FIG. 6. In the example of FIG. 6, the actual major axis diameter of the wound region J, the first measurement line C1 corresponding to the major axis diameter, the actual minor axis diameter of the wound region J, and the second measurement line C2 corresponding to the minor axis diameter are displayed on the monitor 24. In this manner, it is possible for the user to easily understand the actual size of the wound region J.

In a case where the processing of Step S4 is completed, the basic operation of the ultrasound diagnostic apparatus 1 according to the first embodiment of the present invention is ended.

As described above, with the ultrasound diagnostic apparatus 1 according to the first embodiment, using the ultrasound probe 2 as a size reference, the actual size of the wound region J is automatically calculated only by capturing the optical image P including the wound region J and the ultrasound probe 2 by the user, and therefore, in a case where the wound region J on the body surface of the subject is examined together with the examination of the inside of the subject using the ultrasound image, it is possible for the user to smoothly and easily perform the examination of the wound region J.

The image generation unit 22 is provided in the diagnostic apparatus main body 3 in the first embodiment, but may be provided in the ultrasound probe 2 instead of being provided in the diagnostic apparatus main body 3. In this case, the ultrasound image generated in the image generation unit 22 is wirelessly transmitted from the probe-side wireless communication unit 13 to the main body-side wireless communication unit 21, and is further sent from the main body-side wireless communication unit 21 to the display control unit 23.

The wound size calculation unit 27 calculates the major axis diameter and the minor axis diameter of the wound region J as the size of the wound region J, but the type of value to be calculated as the size of the wound region J is not limited thereto. For example, the wound size calculation unit 27 can also calculate the area of the wound region J as the size of the wound region J.

The wound size calculation unit 27 stores the actual size of the ultrasound probe 2 in advance, but the actual size of the ultrasound probe 2 can be input by the user via the input device 30, for example.

For example, the wound size calculation unit 27 stores actual sizes of a plurality of types of ultrasound probes 2, and in a case where an identifier for identifying the type of the ultrasound probe 2, such as a model number of the ultrasound probe 2, is input by the user via the input device 30, the actual size of the ultrasound probe 2 corresponding to the identifier can be used. In this manner, for example, even in a case where the ultrasound probe 2 is replaced with another type of the ultrasound probe 2, the wound size calculation unit 27 can calculate the actual size of the wound region J on the basis of the actual size of the ultrasound probe 2.

The wound size calculation unit 27 can recognize the ultrasound probe 2 extracted by the extraction unit 26, and use the actual size of the recognized ultrasound probe 2 for the calculation of the actual size of the wound region J. In this case, the user can save the trouble of manually inputting information on the ultrasound probe 2 via the input device 30, and therefore, it is possible for the user to examine the wound region J more smoothly.

Second Embodiment

In general, in a case where the wound region J appears on the body surface, an abnormal portion may be generated in the deep portion of the wound region. Here, the abnormal portion in the present invention refers to, for example, a site where a so-called pressure ulcer has occurred, a site where edema has occurred in the vicinity of the pressure ulcer, a site where edema which is a kind of phlebitis has occurred, and surrounding regions thereof. The wound region J on the body surface of the subject is extracted in the first embodiment, but a deep portion region of the abnormal portion present in the subject can be further detected, and the shape of the deep portion region can be displayed on the monitor 24.

Figure 9:
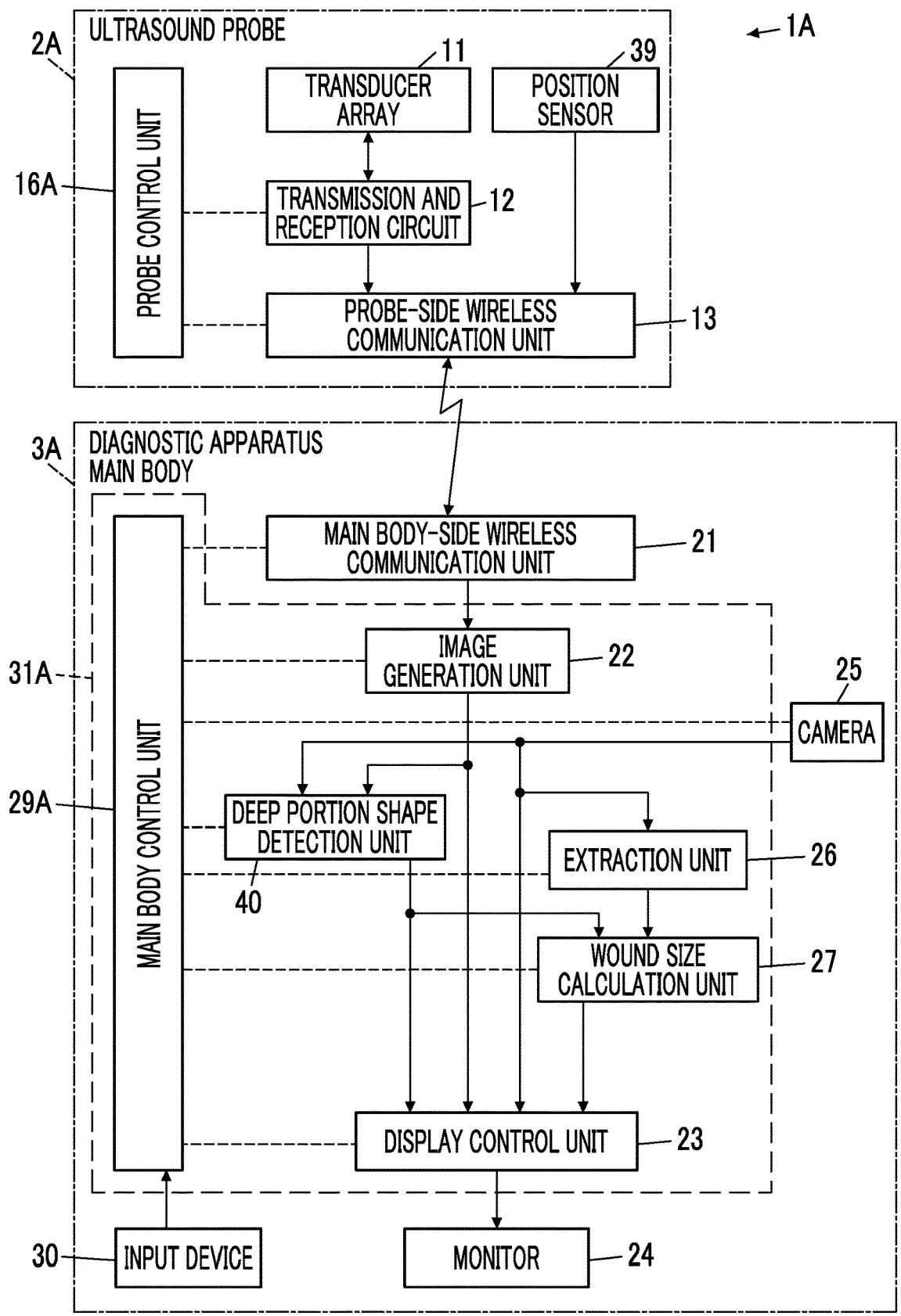
FIG. 9 is a block diagram illustrating a configuration of an ultrasound diagnostic apparatus according to a second embodiment of the present invention.

FIG. 9 illustrates a configuration of an ultrasound diagnostic apparatus 1A according to a second embodiment. The ultrasound diagnostic apparatus 1A of the second embodiment includes an ultrasound probe 2A and a diagnostic apparatus main body 3A.

The ultrasound probe 2A is obtained by adding a position sensor 39 and using a probe control unit 16A instead of the probe control unit 16, in the ultrasound probe 2 in the first embodiment. The position sensor 39 is connected to the probe-side wireless communication unit 13.

The position sensor 39 is a sensor for detecting the positional information of the ultrasound probe 2A. The position sensor 39 is configured by, for example, an acceleration sensor, a gyro sensor, and a magnetic sensor.

The diagnostic apparatus main body 3A is obtained by adding a deep portion shape detection unit 40 and including a main body control unit 29A instead of the main body control unit 29, in the diagnostic apparatus main body 3 of the first embodiment. The image generation unit 22, the display control unit 23, the camera 25, and the wound size calculation unit 27 are connected to the deep portion shape detection unit 40. Further, instead of the main body-side processor 31, a main body-side processor 31A including the deep portion shape detection unit 40 is configured.

Figure 10:
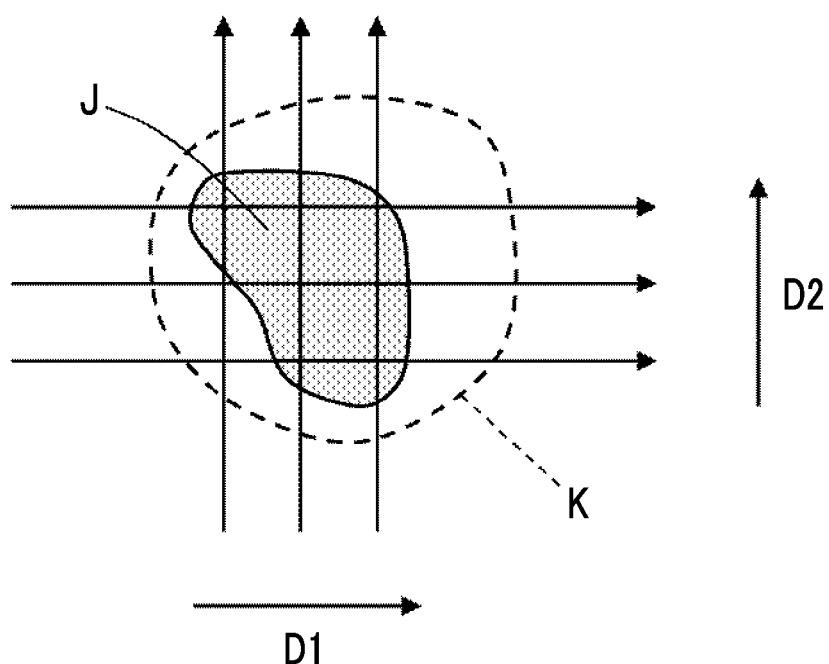
FIG. 10 is a diagram schematically illustrating a scanning direction of an ultrasound probe in the second embodiment of the present invention.

For example, as illustrated in FIG. 10, the deep portion shape detection unit 40 detects the shape of a deep portion region K by analyzing a plurality of frames of ultrasound images generated by the image generation unit 22 while a plurality of scans of the ultrasound probe 2A are performed to pass through the wound region J and a region in the vicinity thereof, and displays the deep portion region K on the optical image P in a superimposed manner. In the example of FIG. 10, a plurality of scans of the ultrasound probe 2A are performed along each of a first direction D1 and a second direction D2 orthogonal to the first direction D1.

Here, the deep portion region K refers to a region obtained by projecting a three-dimensional region in the subject including the abnormal portion onto the body surface of the subject, and the shape of the deep portion region K is a shape of the deep portion inside the subject corresponding to the wound region J.

Figure 11:
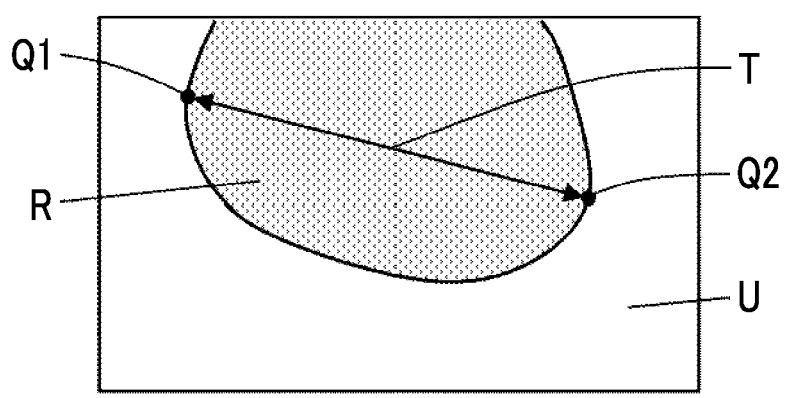
FIG. 11 is a schematic diagram of an ultrasound image showing a cross section of an abnormal portion.

For example, in a case of detecting the deep portion region K, the deep portion shape detection unit 40 analyzes the ultrasound image U as illustrated in FIG. 11, recognizes an abnormal portion R in the ultrasound image U, and detects two points Q1 and Q2 with a maximum distance T between the two points, among two points on the contour of the abnormal portion R. Further, the deep portion shape detection unit 40 stores a correspondence relationship between the actual length and the length on the ultrasound image U, and calculates coordinates representing the actual position of the points Q1 and Q2 on the body surface of the subject on the basis of the positional information of the ultrasound probe 2A acquired by the position sensor 39. The deep portion shape detection unit 40 performs similar processing on the plurality of frames of ultrasound images U, and detects a closed curve passing through the plurality of points Q1 and Q2 obtained for each of the ultrasound images U, as the shape of the deep portion region K.

Here, in a case where the abnormal portion R in the ultrasound image U is recognized, the deep portion shape detection unit 40 can use a deep learning method, a template matching method, and a machine learning method, for example.

The deep portion shape detection unit 40 performs registration processing of the detected shape of the deep portion region K and the optical image P on the basis of the positional information of the ultrasound probe 2A acquired by the position sensor 39, and displays the shape of the deep portion region K on the monitor 24 so that the shape of the deep portion region K is superimposed on the optical image P. For example, the deep portion shape detection unit 40 can perform registration processing of the shape of the deep portion region K and the optical image P by using an image processing method called so-called non-rigid registration.

Similarly to the processing of calculating the actual size of the wound region J extracted by the extraction unit 26, the wound size calculation unit 27 calculates the actual size of the shape of the deep portion region K detected by the deep portion shape detection unit 40, and displays the actual size of the shape of the deep portion region K on the monitor 24.

Figure 12:
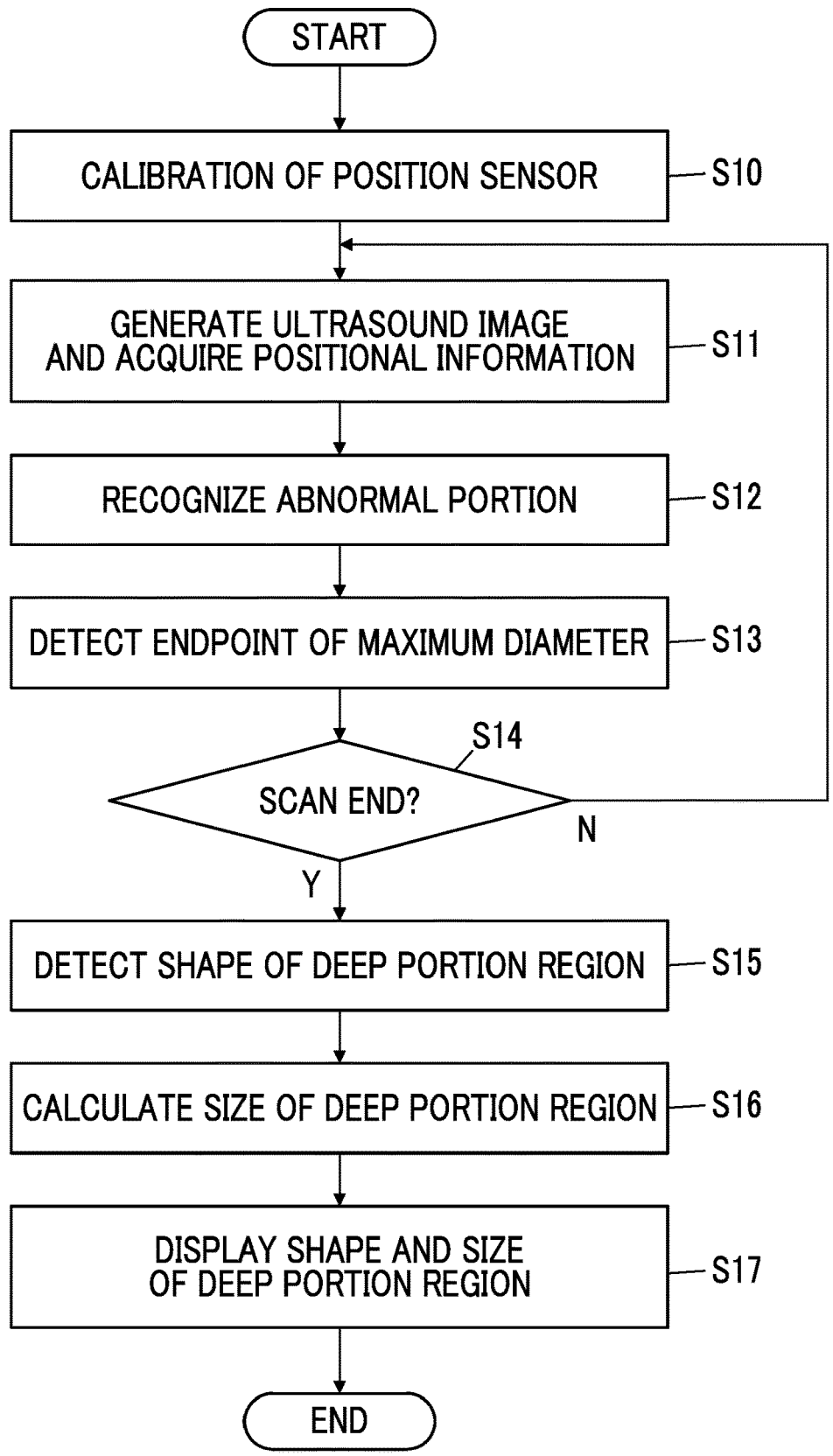
FIG. 12 is a flowchart illustrating an operation of the ultrasound diagnostic apparatus according to the second embodiment of the present invention.

In the following, the operation of the ultrasound diagnostic apparatus 1A for detecting the shape of the deep portion region K and displaying the shape and the actual size on the monitor 24 will be described using the flowchart of FIG. 12. Here, it is assumed that the operation illustrated in the flowchart of FIG. 12 is performed in addition to the operation illustrated in the flowcharts of FIGS. 7 and 8.

First, in Step S10, the calibration of the position sensor 39 is performed.

In this case, the main body control unit 29A displays, on the monitor 24, a guide to move the ultrasound probe 2A in parallel while the ultrasound probe 2A is in contact with the body surface of the subject in a state where the ultrasound probe 2A is shown in the optical image P captured by the camera 25. Further, the main body control unit 29A controls the camera 25 to capture a plurality of frames of optical images P while the guide is displayed. The positional information of the ultrasound probe 2A is acquired by the position sensor 39 while the guide is displayed.

In this manner, the user checks the guide displayed on the monitor 24, and moves the ultrasound probe 2A in parallel, and thereby the plurality of frames of optical images P in which the ultrasound probe 2A is arranged at a plurality of positions on the body surface of the subject, and the positional information of the ultrasound probe 2A corresponding to the positions on the body surface of the subject, where the plurality of frames of optical images P are acquired, are acquired. The plurality of frames of optical images P captured in this manner and the positional information of the ultrasound probe 2A are sent to the deep portion shape detection unit 40.

The deep portion shape detection unit 40 detects the position of the ultrasound probe 2A in the plurality of frames of optical images P by analyzing the plurality of frames of optical images P. The deep portion shape detection unit 40 calculates the correspondence relationship between the position on the body surface of the subject in the optical image P and the actual position on the body surface of the subject by comparing the position of the detected ultrasound probe 2A on the optical image P with the positional information of the ultrasound probe 2A acquired by the position sensor 39. In this manner, the calibration of the position sensor 39 is completed.

Next, in Step S11, for example, as illustrated in FIG. 10, the ultrasound image U is captured while the ultrasound probe 2A is moved in parallel along the first direction D1 or the second direction D2 in a state where the ultrasound probe 2A is in contact with the body surface of the subject. In this case, the positional information of the ultrasound probe 2A is acquired by the position sensor 39.

In a case of capturing the ultrasound image U, an ultrasound beam is transmitted into the subject from the plurality of transducers of the transducer array 11 according to the drive signal from the pulser 32 of the transmission and reception circuit 12, and the reception signal is output to amplification unit 33 of the transmission and reception circuit 12 from each transducer which has received the ultrasound echo from the subject.

The reception signal is amplified in the amplification unit 33, is subjected to the AD conversion in the AD conversion unit 34, and is phased and added in the beam former 35, and thereby the sound ray signal is generated. The sound ray signal is wirelessly transmitted from the probe-side wireless communication unit 13 to the main body-side wireless communication unit 21, and is sent to the image generation unit 22. The sound ray signal is subjected to the envelope detection processing by the signal processing unit 36 of the image generation unit 22 to be the B-mode image signal, and passes through the DSC 37 and the image processing unit 38, and thereby the ultrasound image U is generated.

The ultrasound image U generated in this manner is sent to the monitor 24 via the display control unit 23, and is also sent to the deep portion shape detection unit 40.

Further, the positional information of the ultrasound probe 2A acquired by capturing the ultrasound image U is sent to the deep portion shape detection unit 40.

Next, in Step S12, the deep portion shape detection unit 40 recognizes the abnormal portion R by analyzing the ultrasound image U generated in Step S11, as illustrated in FIG. 11.

In subsequent Step S13, the deep portion shape detection unit 40 detects two points Q1 and Q2 with the maximum distance T between the two points among two points on the contour of the abnormal portion R recognized in Step S12. Further, the deep portion shape detection unit 40 stores the correspondence relationship between the distance on the ultrasound image U and the actual distance, and calculates the coordinates representing the actual positions of the points Q1 and Q2 on the basis of the correspondence relationship between the distance on the ultrasound image U and the actual distance, and the positional information of the ultrasound probe 2A acquired in Step S11.

In Step S14, the main body control unit 29A determines whether or not the scan of the ultrasound probe 2A is to be ended. For example, in a case where an instruction to end the scan of the ultrasound probe 2A is made by the user's input operation via the input device 30, it is determined that the scan of the ultrasound probe 2A is to be ended, and in a case where an instruct to end the scan of the ultrasound probe 2A is not made, it is determined that the scan of the ultrasound probe 2A is continued without ending the scan.

In a case where it is determined in Step S14 that the scan of the ultrasound probe 2A is continued, the processing returns to Step S11. In this case, the ultrasound image U is newly generated in Step S11, and the positional information of the ultrasound probe 2A is newly acquired by the position sensor 39. In Step S12, the abnormal portion R is recognized by analyzing the ultrasound image U that is newly generated in Step S11, and in Step S13, two points Q1 and Q2 that are endpoints of the maximum diameter of the abnormal portion R recognized in Step S12 are detected, and the coordinates representing the actual positions of the points are calculated.

In this manner, processing of Step S1/ to Step S14 is repeated unless it is determined in Step S14 that the scan of the ultrasound probe 2A is to be ended.

In a case where it is determined in Step S14 that the scan of the ultrasound probe 2A is to be ended, the processing proceeds to Step S15.

In subsequent Step S15, the deep portion shape detection unit 40 repeats Step S1/ to Step S14, plots the coordinates of the points Q1 and Q2 detected for each of the plurality of frames of ultrasound images U on a coordinate plane, and detects the closed curve passing through the plurality of plotted points Q1 and Q2 as the shape of the deep portion region K.

In Step S16, the wound size calculation unit 27 calculates the major axis diameter and the minor axis diameter of the shape of the deep portion region K detected in Step S15, as the actual size of the shape of the deep portion region K by a method similar to the method of calculating the major axis diameter and the minor axis diameter of the wound region J in Step S7 and Step S8 in the first embodiment. In this manner, with the wound size calculation unit 27, it is possible to easily calculate the actual size of the shape of the deep portion region K.

In Step S17, the deep portion shape detection unit 40 displays the shape of the deep portion region K detected in Step S15 on the monitor 24 so that the shape of the deep portion region K is superimposed on the optical image P.

In this case, the optical image P is newly captured by the camera 25.

Figure 13:
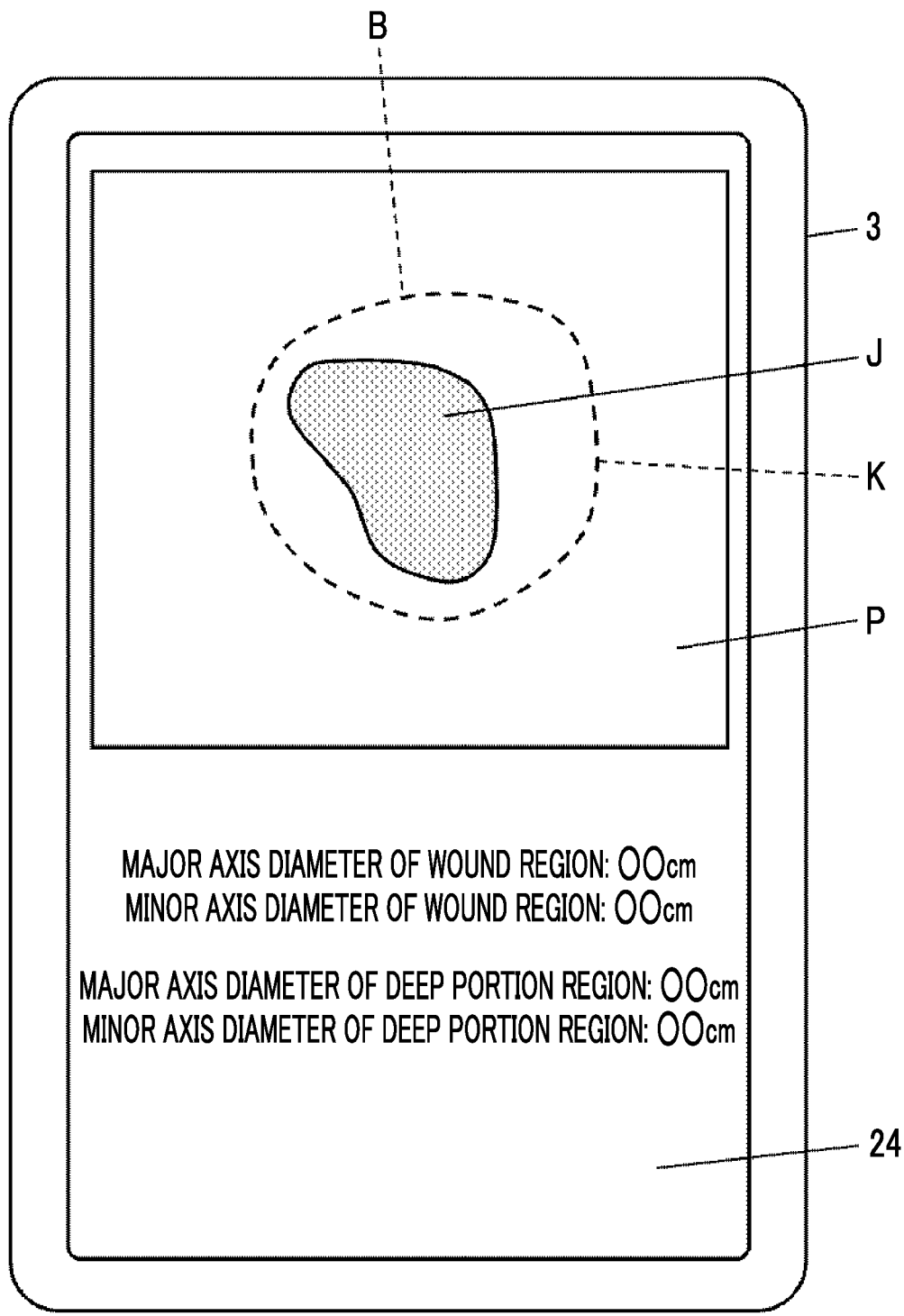
FIG. 13 is a diagram schematically illustrating an example of an optical image in which an abnormal portion and a wound region are displayed in a superimposed manner.

The deep portion shape detection unit 40 performs registration of the shape of the deep portion region K detected in Step S15 and the captured optical image P by using the correspondence relationship between the position on the body surface of the subject in the optical image P obtained in Step S10 and the actual position on the body surface of the subject, and displays the shape of the deep portion region K detected in Step S15 on the monitor 24 so that the shape of the deep portion region K is superimposed on the optical image P as illustrated in FIG. 13.

The wound size calculation unit 27 displays the actual size of the shape of the deep portion region K calculated in Step S16 on the monitor 24.

In the example of FIG. 13, a contour line B representing the shape of the deep portion region K is displayed on the monitor 24 by being superimposed on the optical image P, and the value of the major axis diameter and the value of the minor axis diameter of the deep portion region K are displayed on the monitor 24 as the actual size of the shape of the deep portion region K.

In a case where the processing of Step S17 is completed, the operation of the ultrasound diagnostic apparatus 1A according to the second embodiment is ended.

As described above, with the ultrasound diagnostic apparatus 1A according to the second embodiment, since not only the wound region J on the body surface of the subject but also the shape of the deep portion region K present inside the subject is displayed on the monitor 24, it is possible for the user to smoothly perform the examination of the abnormal portion while checking the shape and position of the deep portion region K that cannot normally be visually checked. Further, since the actual size of the shape of the deep portion region K is automatically calculated, the user can save the trouble of measuring the size of the shape of the deep portion region K, and thereby it is possible to smoothly perform the examination of the abnormal portion.

The wound size calculation unit 27 calculates the major axis diameter and the minor axis diameter of the deep portion region K as the size of the deep portion region K, but the type of value to be calculated as the size of the deep portion region K is not limited thereto. For example, the wound size calculation unit 27 can also calculate the area of the deep portion region K as the size of the deep portion region K.

EXPLANATION OF REFERENCES 1, 1A: ultrasound diagnostic apparatus
2, 2A: ultrasound probe
3, 3A: diagnostic apparatus main body
11: transducer array
12: transmission and reception circuit
13: probe-side wireless communication unit
16, 16A: probe control unit
21: main body-side wireless communication unit
22: image generation unit
23: display control unit
24: monitor
25: camera
26: extraction unit
27: wound size calculation unit
29, 29A: main body control unit
30: input device
31, 31A: main body-side processor
32: pulser
33: amplification unit
34: AD conversion unit
35: beam former
36: signal processing unit
37: DSC
38: image processing unit
B: contour line
C1: first measurement line
C2: second measurement line
D1: first direction
D2: second direction
J: wound region
K: deep portion region
L1: length
P: optical image
Q1, Q2: point
R: abnormal portion
U: ultrasound image

What is claimed is:

1. An ultrasound diagnostic apparatus comprising:
an ultrasound probe having a predetermined size; and
a portable diagnostic apparatus main body,
wherein the ultrasound probe has a sensor configured to detect positional information of the ultrasound probe, and
the portable diagnostic apparatus main body includes
a monitor,
a camera configured to capture an optical image including a wound region located on a body surface of a subject and the ultrasound probe, and
a processor configured to:
generate a plurality of ultrasound images for the wound region by performing transmission and reception of an ultrasound beam using the ultrasound probe,
recognize a cross section of an abnormal portion, located inside the subject, in each of the plurality of ultrasound images by analyzing each of the plurality of ultrasound images,
extract the wound region and the ultrasound probe from the optical image, calculate a size of the wound region by:
  calculating a length per pixel in the optical image by comparing the predetermined size of the ultrasound probe with a measured pixel length of the extracted ultrasound probe,
  calculating a first pixel measurement line as a major axis diameter of the extracted wound region and calculating a second pixel measurement line as a minor axis diameter of the extracted wound region, and
  converting the major axis diameter and the minor axis diameter of the extracted wound region into the calculated size of the wound region,
display the calculated size of the wound region on the monitor,
detect a contour shape of the abnormal portion viewed from a body surface side of the subject, based on the positional information of the ultrasound probe detected during generating the plurality of ultrasound images and the cross section of the abnormal portion recognized from each of the plurality of ultrasound images,
perform registration processing of the detected contour shape of the abnormal portion and the optical image based on the positional information of the ultrasound probe detected during generating the plurality of ultrasound images,
display the detected contour shape of the abnormal portion on the monitor superimposed on the optical image,
calculate a size of the detected contour shape of the abnormal portion based on the comparing of the predetermined size of the ultrasound probe with the measured pixel length of the extracted ultrasound probe and the detected contour shape determined by:
  calculating a third pixel measurement line as a major axis diameter of the detected contour shape and calculating a fourth pixel measurement line as a minor axis diameter of the detected contour shape, and
  converting the major axis diameter and the minor axis diameter of the detected contour shape into the calculated size of the detected contour shape, and
display the calculated size and a shape of the detected contour shape of the abnormal portion on the monitor superimposed on the optical image including the wound region, such that a user of the ultrasound diagnostic apparatus is able view the wound region on the body surface of the subject together with the abnormal portion inside the subject.

2. The ultrasound diagnostic apparatus according to claim 1, wherein the first pixel measurement line is longer than the second pixel measurement line.

3. A control method of an ultrasound diagnostic apparatus, the control method comprising:
capturing an optical image including a wound region located on a body surface of a subject and an ultrasound probe having a predetermined size;
generating a plurality of ultrasound images for the wound region by performing transmission and reception of an ultrasound beam using the ultrasound probe;
detecting positional information of the ultrasound probe during generating the plurality of ultrasound images by using a sensor;
recognizing a cross section of an abnormal portion, located inside the subject, in each of the plurality of ultrasound images by analyzing each of the plurality of ultrasound images;
displaying the optical image and the plurality of ultrasound images;
extracting the wound region and the ultrasound probe from the optical image;
calculating a size of the wound region by:
  calculating a length per pixel in the optical image by comparing the predetermined size of the ultrasound probe with a measured pixel length of the extracted ultrasound probe,
  calculating a first pixel measurement line as a major axis diameter of the extracted wound region and calculating a second pixel measurement line as a minor axis diameter of the extracted wound region, and
  converting the major axis diameter and the minor axis diameter of the extracted wound region into the calculated size of the wound region,
displaying the calculated size of the wound region on a monitor;
detecting a contour shape of the abnormal portion viewed from a body surface side of the subject, based on the positional information of the ultrasound probe detected during generating the plurality of ultrasound images and the cross section of the abnormal portion recognized from each of the plurality of ultrasound images;
performing registration processing of the detected contour shape of the abnormal portion and the optical image based on the positional information of the ultrasound probe detected during generating the plurality of ultrasound images;
displaying the detected contour shape of the abnormal portion on the monitor superimposed on the optical image;
calculating a size of the detected contour shape of the abnormal portion based on the comparing of the predetermined size of the ultrasound probe with the measured pixel length of the extracted ultrasound probe and the detected contour shape determined by:
  calculating a third pixel measurement line as a major axis diameter of the detected contour shape and calculating a fourth pixel measurement line as a minor axis diameter of the detected contour shape, and
  converting the major axis diameter and the minor axis diameter of the detected contour shape into the calculated size of the detected contour shape, and
displaying the calculated size and shape of the detected contour shape of the abnormal portion on the monitor superimposed on the optical image including the wound region, such that a user of the ultrasound diagnostic apparatus is able view the wound region on the body surface of the subject together with the abnormal portion inside the subject.

4. The ultrasound diagnostic apparatus according to claim 2, wherein the second pixel measurement line is orthogonal to the first pixel measurement line.

* * * * *